US012714070B2

(12) United States Patent
Diskin et al.

(10) Patent No.: US 12,714,070 B2
(45) **Date of Patent: *Aug. 25, 2026**

(54) HANGING CAT SCRATCHER

(71) Applicant: Worldwise, Inc., Novato, CA (US)

(72) Inventors: Aimee Diskin, Napa, CA (US); Hannah Rosenberg, San Francisco, CA (US); Michael Risso, Napa, CA (US); Julie Widenhofer, San Anselmo, CA (US); Lisa Davis, Novato, CA (US)

(73) Assignee: WORLDWISE, INC., Novato, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,953

(22) Filed: Jul. 9, 2024

(65) Prior Publication Data

US 2024/0357997 A1 Oct. 31, 2024

Related U.S. Application Data

(63) Continuation of application No. 17/875,538, filed on Jul. 28, 2022, now Pat. No. 12,035,690.

(51) Int. Cl.
*A01K 15/02* (2006.01)

(52) U.S. Cl.
CPC .................................. *A01K 15/024* (2013.01)

(58) Field of Classification Search
CPC .... A01K 15/024; A01K 15/00; A01K 15/025; A01K 13/004
USPC .......................................................... 119/706
See application file for complete search history.

(56) References Cited

U.S. PATENT DOCUMENTS 3,085,551 A * 4/1963 Helmer ................ A01K 15/024 119/706
3,486,485 A * 12/1969 Kahanick ............. A01K 15/024 119/706
4,391,223 A * 7/1983 Holland ................. A01K 1/033 229/196
4,539,936 A * 9/1985 Majewski ............ A01K 15/024 49/460
4,932,360 A * 6/1990 O'Connor ............ A01K 1/0125 119/168
5,117,781 A * 6/1992 Roach .................. A01K 1/0125 119/168
5,167,205 A * 12/1992 Bell ..................... A01K 1/0125 229/122.34
5,247,902 A * 9/1993 Williams ............. A01K 15/024 119/706

(Continued)

OTHER PUBLICATIONS

"Petlinks Hang Scrather Tower" available Sep. 11, 2019, [online], [site visited Jul. 10, 2025]. Retrieved from Internet, URL:https://www.amazon.com/Petlinks-Scratchers-Hanging-Corrugate-Scratcher/dp/B07XRXCLTB?th=1 (Year: 2019).

(Continued)

*Primary Examiner* — Maria E Graber
(74) *Attorney, Agent, or Firm* — Calfee, Halter & Griswold LLP

(57) ABSTRACT

A cat scratcher having a frame of sidewalls encompassing a block of open-fluted cardboard and a planar back member with a removable panel. Removing the panel exposes a surface of the block of open-fluted cardboard. The panel may be defined by perforations in the planar back member.

16 Claims, 3 Drawing Sheets

(56) References Cited

U.S. PATENT DOCUMENTS 5,251,573 A * 10/1993 Bremley .............. A01K 1/0125 119/168
5,320,065 A * 6/1994 Leopold ................. A01K 1/035 229/120.32
5,379,552 A * 1/1995 Smith .................. A01K 15/024 49/460
6,302,118 B1 * 10/2001 Adamczyk ........... A01K 15/024 132/76.4
6,895,898 B1 * 5/2005 Kitch ..................... A01K 1/033 D30/114
7,011,043 B2 * 3/2006 Diep .................... A01K 15/024 119/706
7,117,821 B2 * 10/2006 Novak ................. A01K 15/024 119/706
D555,299 S * 11/2007 Tsengas ........................ D30/160
D563,059 S * 2/2008 Lamstein ...................... D30/160
D589,657 S * 3/2009 Lamstein ...................... D30/118
7,549,391 B2 * 6/2009 Vadis ................... A01K 63/003 119/6.5
7,565,884 B2 * 7/2009 Lamstein ............. A01K 15/024 119/706
7,647,893 B2 * 1/2010 Kraus .................. A01K 1/0356 119/702
D644,797 S * 9/2011 Haaf ............................ D30/160
D648,078 S * 11/2011 Haaf ............................ D30/160
8,141,519 B2 * 3/2012 Salzman ................ A01K 1/033 119/482
D663,491 S * 7/2012 Haaf ............................ D30/160
D665,138 S * 8/2012 Haaf ............................ D30/160
8,578,890 B1 * 11/2013 Haaf .................... A01K 15/024 119/706
D696,821 S * 12/2013 Haaf ............................ D30/160
8,640,652 B2 * 2/2014 Callari ................... A01K 1/035 119/702
9,624,026 B1 * 4/2017 Al-Heraibi ............. B65D 43/02
10,111,406 B2 * 10/2018 Rogers ....................... B32B 7/05
10,327,420 B2 * 6/2019 Diskin ................. A01K 15/024
10,412,926 B2 * 9/2019 Chen ...................... A01K 1/033
D871,688 S * 12/2019 Long, Jr. ...................... D30/161
10,609,903 B1 * 4/2020 Tsengas ............... A01K 15/024
D887,093 S 6/2020 Ruppert
10,893,656 B2 * 1/2021 Chen .................... A01K 15/024
D922,211 S * 6/2021 Kurker ........................... D9/734
12,035,690 B2 7/2024 Diskin et al.
2004/0139926 A1 * 7/2004 Diep .................... A01K 15/024 119/601
2005/0170040 A1 * 8/2005 Moulton .............. A01K 15/026 426/1
2006/0042560 A1 * 3/2006 Novak ................. A01K 15/024 119/706
2006/0137623 A1 * 6/2006 Lamstein ............. A01K 15/024 119/706
2006/0191490 A1 * 8/2006 Lamstein ............. A01K 15/024 119/706
2007/0295282 A1 * 12/2007 Lamstein ............. A01K 15/024 119/706
2008/0149041 A1 * 6/2008 Lamstein ............. A01K 15/024 119/706
2008/0290150 A1 * 11/2008 Kraus .................. A01K 1/0356 229/149
2008/0295782 A1 * 12/2008 Ebert ........................ B32B 3/28 119/706
2009/0188439 A1 * 7/2009 Simpson .............. A01K 15/024 119/706
2010/0050953 A1 * 3/2010 Fails, Jr. .............. A01K 15/024 119/706
2010/0122665 A1 * 5/2010 Delzio ................. A01K 15/024 119/706
2010/0326367 A1 * 12/2010 Wedertz ............... A01K 15/024 119/706
2013/0206079 A1 * 8/2013 Lipscomb ............ A01K 15/024 119/706
2014/0000531 A1 * 1/2014 Sumitsuji ............. A01K 15/025 119/707
2014/0014043 A1 * 1/2014 McCann .............. A01K 15/024 119/706
2016/0000039 A1 * 1/2016 Chou ................... A01K 15/024 119/706
2016/0338315 A1 * 11/2016 Floyd ................... A01K 1/0245
2016/0338320 A1 * 11/2016 Floyd ................... A01K 15/024
2017/0137206 A1 * 5/2017 Ting ................... B65D 5/46008
2018/0206451 A1 * 7/2018 Rogers .................. B32B 29/005
2018/0271060 A1 * 9/2018 Hansen ................ A01K 13/004
2022/0053734 A1 * 2/2022 Lofranco ............. A01K 15/024
2023/0098429 A1 * 3/2023 Snyder ................... B31D 3/007 119/706
2023/0165217 A1 * 6/2023 Guo ..................... A01K 15/024 119/706
2023/0165218 A1 * 6/2023 Dominguez ......... A01K 15/024 119/706
2023/0397574 A1 * 12/2023 Kacic ................... A01K 15/024

OTHER PUBLICATIONS

"SmartyKat Scratch Up Corrugated Hanging Cat Scrather" available Jun. 1, 2012, [online], [site visited Jul. 10, 2025]. Retrieved from Internet, URL:https://www.amazon.com/SmartyKat-Corrugated-Cardboard-Catnip-Infused-Reversible/dp/B009YQ5KJM?th=1 (Year: 2012).

"SmartyKat Scratch Up" available Jun. 13, 2022, [online], [site visited Jul. 10, 2025]. Retrieved from Internet, URL:https://www.chewy.com/smartykat-scratch-up-catnip-infusion/dp/362628 (Year: 2022).

"Hanging Cat Scratcher" available Aug. 14, 2024, [online], [site visited Jul. 10, 2025]. Retrieved from Internet, URL:https://www.amazon.com/cat-Scratcher%EF%BC%8Ccat-Scratching-Scratching%EF%BC%8Ccat-pad%EF%BC%8CScratch/dp/B0DD36ZVGF (Year: 2024).

Office Action from Design U.S. Appl. No. 29/834,065 dated Jul. 14, 2025, 6 pages.

* cited by examiner

HANGING CAT SCRATCHER

CROSS-REFERENCE TO RELATED APPLICATIONS

This application is a continuation of U.S. patent application Ser. No. 17/875,538, filed Jul. 28, 2022, and entitled HANGING CAT SCRATCHER, the entire disclosure of which is hereby incorporated herein by reference in its entirety.

TECHNICAL FIELD

The present invention involves a cat scratcher-based attractant and amusement device capable of encouraging a domestic cat to employ a dedicated scratching surface rather than furniture, carpets and drapes and to maintain a cat's interest for prolonged periods of time in doing so.

BACKGROUND

It is quite important for the health and well-being of a pet to not only feed it properly but also provide it with stimulating activities. Pets which become bored oftentimes become destructive not only of their surroundings but also themselves. Animals which are not appropriately stimulated can actually suffer adverse health effects and as a consequence. As such, proper pet stimulation should be a significant consideration for virtually all pet owners.

It is similarly well recognized that domestic cats crave scratching as part of their natural instinctive character. If a dedicated scratching surface is not provided, domestic cats will generally satisfy their need to scratch by turning to furniture, curtains and other articles which can be substantially damaged as a consequence. Often times, pet cats will not only climb over furniture, specifically upholstered chairs and sofas, but will use such furniture and carpeting to condition their claws through deliberate repeated clawing, pulling and tearing actions specifically with their forepaws. As noted, this clawing activity appears to be an irresistible natural impulse for cats and can be the source of great aggravation to pet owners.

However, the process of scratching is necessarily destructive as the surface must give to some extent to satisfy the cat. Correspondingly, the exposed surface is subject to degradation and once sufficiently worn, loses its appeal to the cat.

It is thus an object of the present invention to provide a cat scratcher having increased longevity that may occupy a cat for a relatively greater length of time.

It is a further object of the present invention to provide a cat scratcher that includes corrugate blocks that can be treated with an appropriate attractant to help stimulate the cat and encourage use of the cat scratcher.

It is still a further object of the present invention to provide a cat scratcher which maintains integrity over time to facilitate use by the cat.

These and further examples will be more readily apparent when considering the following disclosure and appended claims.

SUMMARY

A cat scratcher comprising a frame of sidewalls encompassing a block of open-fluted cardboard and a planar back member with a removable panel. Removing the panel exposes a surface of the block of open-fluted cardboard. The panel may be defined by perforations in the planar back member.

DETAILED DESCRIPTION

Figure 1:
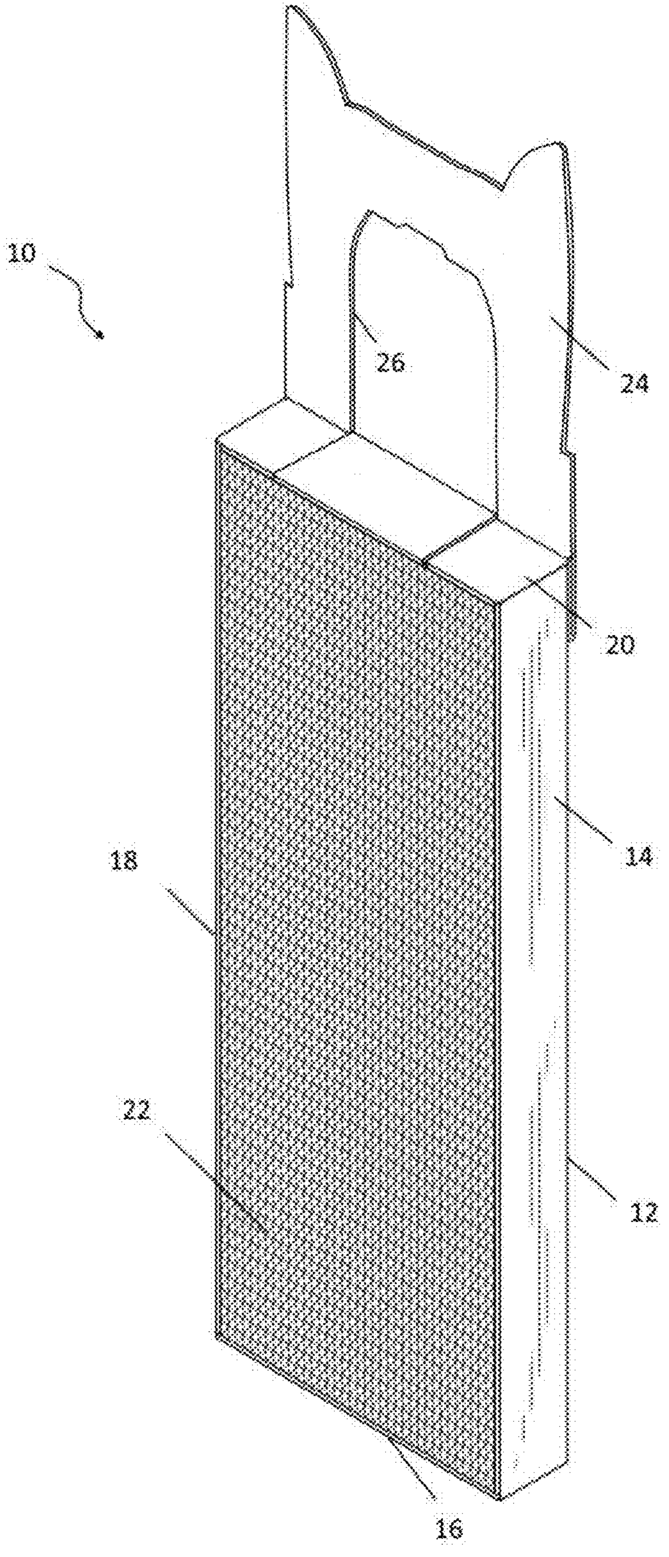
FIG. 1 is a perspective view of the cat scratcher, according to an embodiment of the disclosure.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

Figures 2, 3:
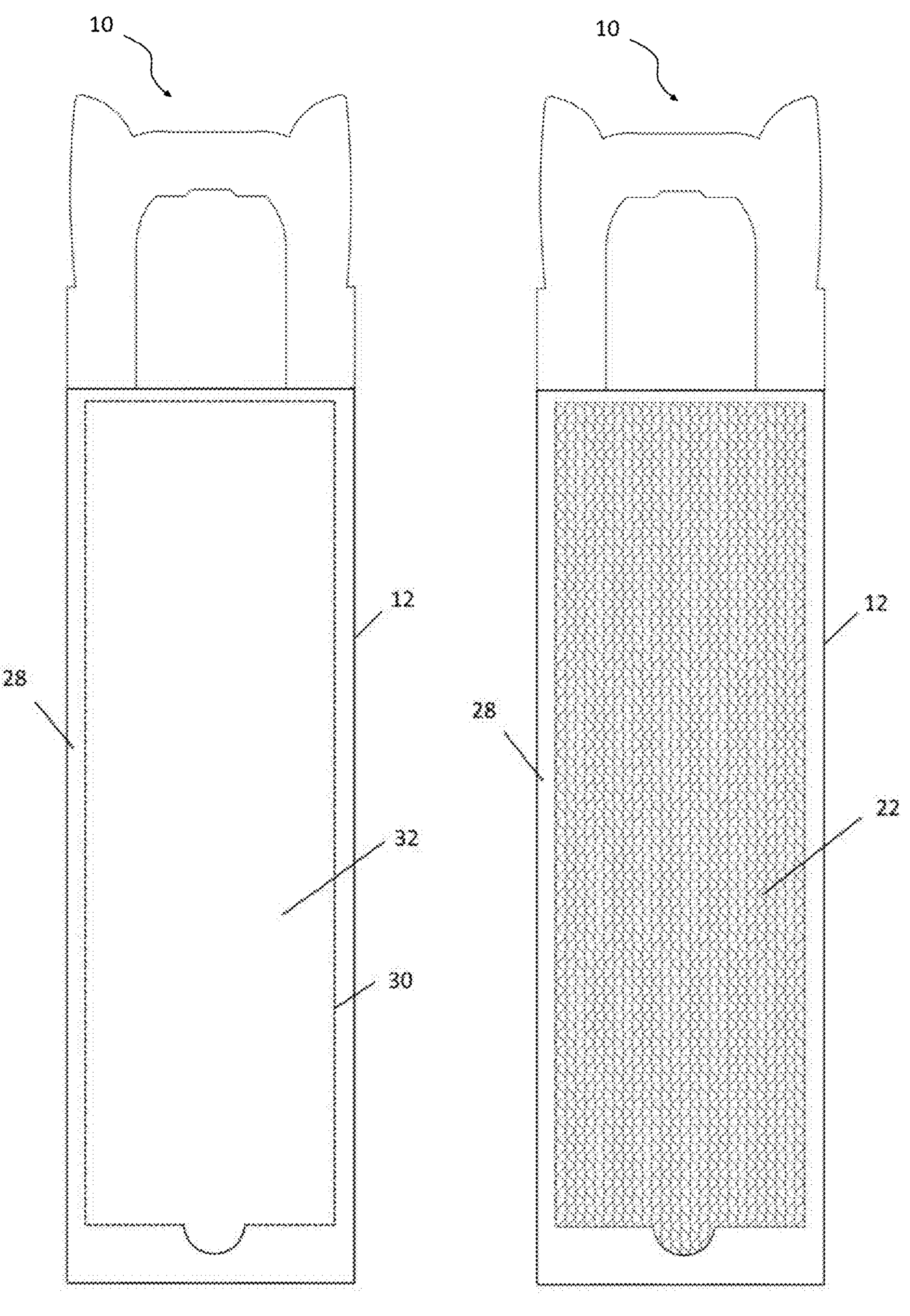
FIG. 2 is an elevational view of the back of the cat scratcher illustrating the perforated panel, according to an embodiment of the disclosure.
FIG. 3 is an elevational view of the back of the cat scratcher with the perforated panel removed, according to an embodiment of the disclosure.

In turning first to FIG. 1, an embodiment of this disclosure is cat scratcher 10 that includes a substantially rectangular box 12 ideally composed of cardboard bent and configured into the shape as illustrated and defined by four sidewalls 14, 16, 18 and 20. A block 22 of open-fluted corrugated cardboard is encompassed and is affixed to the sidewalls so that a front surface is exposed and accessible to the cat. Sidewalls 14, 16, 18 and 20 form a frame to support and contain block 22, helping maintain its integrity during use over time. Hanger 24 has an aperture 26 configured to fit over a door handle so that cat scratcher 10 can be hung if desired and is shown in this embodiment with a decorative "cat head" profile but other suitable shapes, such as a hook, are also within the scope of this disclosure. As depicted in FIG. 2, back 28 of box 12 is provided as a planar sheet extending between and secured to the respective opposing sidewalls. Back 28 is preferably of cardboard and has perforated outline 30 that allows panel 32 to be removed to expose a rear surface of block 22 according to FIG. 3. As will be appreciated, removing panel 32 exposes a fresh surface after the front becomes too worn to satisfy the cat and thereby extends the useful working life of cat scratcher 10. In some embodiments, any or all of the sidewalls 14, 16, 18 and 20, hanger 24 and back 28 may be formed from a single sheet of material.

Figure 4:
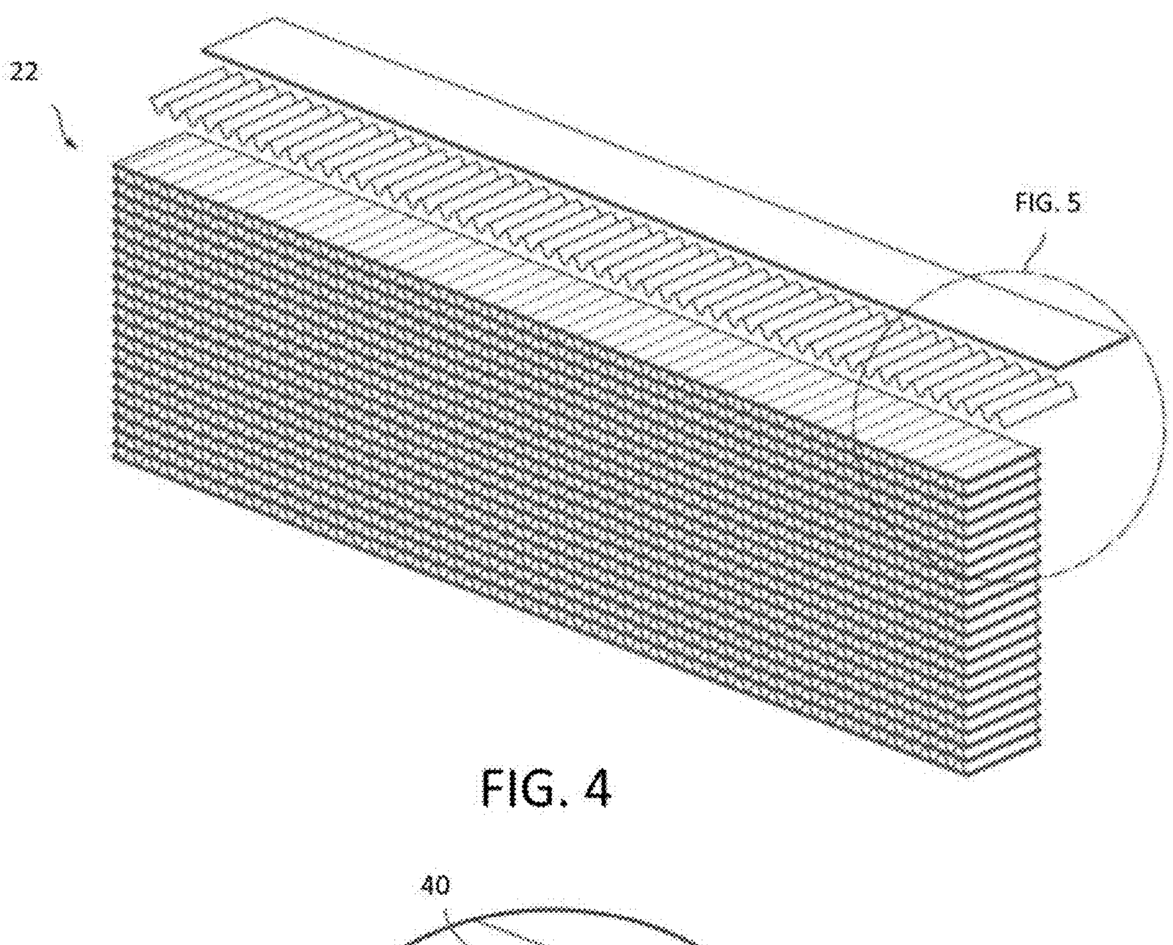
FIG. 4 is a perspective view of a corrugated block useful in constituting the cat scratcher, according to an embodiment of the disclosure.
Figure 5:
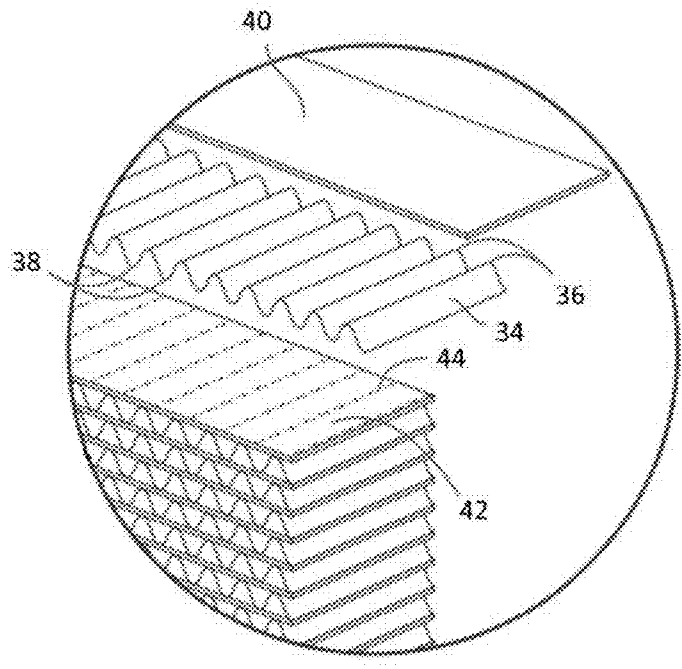
FIG. 5 is a perspective view of the detail of the cardboard block of FIG. 4, according to an embodiment of the disclosure.

It is noted that corrugated cardboard block 22 can be fabricated pursuant to the teachings of commonly-owned U.S. Pat. No. 10,111,406, the disclosure of which is incorporated by reference. Specifically, FIGS. 4 and 5 depict the present invention as it applies to block 22 of corrugated cardboard. As is typically the case, corrugated cardboard comprises a plurality of corrugated subparts, specifically, corrugated sheet 34 having peaks 36 and corresponding valleys 38 and planar sheets of kraft paper 40 and 42 separating each corrugated sheet. Beads of adhesive 44 are applied to the kraft paper such that when corrugated sheet 34 is positioned between opposing sheets of kraft paper 40 and 42, cardboard block 22 is fabricated as a singular, monolithic unit. Generally, starch or dextrin-based adhesives are employed as they are non-toxic and thus pose no health risk to an engaging cat.

In the fabrication of prior cardboard-based scratchers, a common adhesive is employed to glue corrugated and planar sheets together and, if desired, ground catnip or silvervine leaves are sprinkled onto the flutes of the finished cardboard block. As the catnip or silvervine is readily available to the pet, it is quickly dissipated and provides the scratcher with no long-term stimulating effects. As a solution to this deficiency inherent in prior scratchers, the present invention employs a catnip or silvervine hydrosol in a suitable aqueous-based adhesive to create beads 44. It has been found that, in doing so, the integrity of the adhesive is not compromised and yet the desired stimulating effects are available for virtually the entire life of the scratcher.

Furthermore, catnip or silvervine hydrosol, alone, or with chopped catnip leaves can be sprayed onto the surface of block 22 employing, for example, a spray gun to provide catnip or silvervine within the flutes created by corrugated sheets 34. This further enhances the stimulating effects of the scratcher noting that the catnip or silvervine hydrosol penetrates deeply within the flutes and, being a liquid, is absorbed by kraft paper sheets 40 and 42 as well as corrugated sheet 34. Solids, in the nature of chopped catnip or silvervine leaves and/or catnip or silvervine biomass can be included with the catnip or silvervine hydrosol to vary the viscosity of the spray to prevent the spray from passing through block 22 without residing within the flutes as desired employing a proprietary blend of catnip hyrdosol and catnip biomass.

The above disclosure is sufficient to enable one of ordinary skill in the art to practice the invention, and provides the best mode of practicing the invention presently contemplated by the inventor. Notably, as will be appreciated, the techniques of this disclosure provide benefits including efficiency in shipping and increased ability for the cat to relax or lounge in a variety of position, as well as the ability to scratch from different positions, such as standing up or laying on their side(s), along with other advantages. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed:

1. A cat scratcher comprising:

a frame comprising a plurality of sidewalls extending from a rear of the frame to a front of the frame;

a rear surface extending between the plurality of sidewalls to enclose the rear of the frame;

a front opening formed by the plurality of sidewalls of the frame;

a block of corrugated cardboard extending from the rear surface to the front opening, wherein the block of corrugated cardboard comprises an exposed area that is at least equal to an area of the front opening; and a panel formed from a portion of the rear surface, wherein separating the panel from the frame increases the exposed area of the block of corrugated cardboard.

2. The cat scratcher of claim 1, wherein separating the panel from the remainder of the rear surface creates a rear opening in the rear surface.

3. The cat scratcher of claim 2, wherein a seam between the panel and the remainder of the rear surface is formed by a plurality of perforations in the rear surface.

4. The cat scratcher of claim 1, further comprising a hanger connected to the rear surface of the frame.

5. The cat scratcher of claim 4, wherein the hanger is integrally formed with the rear surface.

6. The cat scratcher of claim 5, wherein the hanger and the rear surface are both formed from a sheet of material.

7. The cat scratcher of claim 6, wherein the hanger comprises an aperture for receiving a door handle.

8. A cat scratcher comprising:

a frame comprising a plurality of sidewalls extending from a first side of the frame to a second side of the frame;

a planar surface extending between the plurality of sidewalls to enclose the second side of the frame;

a primary opening formed by the by the plurality of sidewalls at the first side of the frame;

a block of corrugated cardboard extending from the planar surface to the primary opening; and a primary exposed surface of the block of corrugated cardboard, wherein the primary exposed surface is accessible via the primary opening;

a secondary exposed surface of the block of corrugated cardboard, wherein the secondary exposed surface is accessible via a secondary opening in the planar surface;

a hanger connected to the planar surface of the frame; and a panel covering the secondary opening in the planar surface to prohibit access to the secondary exposed surface of the block of corrugated cardboard, wherein the panel is formed from a portion of the planar surface, and wherein separating the panel from a remainder of the planar surface creates the secondary opening in the planar surface.

9. The cat scratcher of claim 8, wherein a seam between the panel and the remainder of the planar surface is formed by a plurality of perforations in the planar surface.

10. The cat scratcher of claim 8, wherein the hanger is integrally formed with the rear surface.

11. The cat scratcher of claim 8, wherein the hanger and the rear surface are both formed from a sheet of material.

12. The cat scratcher of claim 8, wherein the hanger comprises an aperture for receiving a door handle.

13. A method for increasing the longevity of a cat scratcher, the method comprising:

providing a cat scratcher, the cat scratcher comprising:

a frame comprising a plurality of sidewalls and a planar surface that define a cavity;

a block of corrugated cardboard disposed within the cavity of the frame such that a first side of the block of corrugated cardboard is exposed;

a panel covering an opening in the planar surface, wherein the panel prohibits access to a second side of the block of corrugated cardboard, and wherein the panel is formed from a portion of the planar surface; and a hanger connected to the planar surface of the frame; and removing the panel to expose the portion of the second surface of the block of corrugated cardboard through the second opening of the frame, wherein the panel is removed after the first side of the block of corrugated cardboard has become too worn to satisfy a cat.

14. The method of claim 13, wherein prior to removing the panel, the method further comprises hanging the cat scratcher via the hanger so that the first side of the block of corrugated cardboard is unobstructed.

15. The method of claim 14, wherein after removal of the panel, the method further comprises hanging the cat scratcher via the hanger so that the second side of the block of corrugated cardboard is unobstructed.

16. The method of claim 13, wherein the hanger is integrally formed with the planar surface.

* * * * *